(12) United States Patent
Shniberg et al.

(10) Patent No.: US 7,474,333 B2
(45) Date of Patent: *Jan. 6, 2009

(54) METHOD FOR AUTOMATIC IDENTIFICATION AND DATA CAPTURE

(75) Inventors: Moti Shniberg, Elkannah (IL); Yaron Nemet, Kadumim (IL); Erez Sali, Savlon (IL)

(73) Assignee: ImageID, Hod Hasharon (IL)

( * ) Notice: Subject to any disclaimer, the term of this patent is extended or adjusted under 35 U.S.C. 154(b) by 177 days.

This patent is subject to a terminal disclaimer.

(21) Appl. No.: 11/179,814

(22) Filed: Jul. 12, 2005

(65) Prior Publication Data

US 2006/0144939 A1    Jul. 6, 2006

Related U.S. Application Data

(63) Continuation of application No. 10/849,026, filed on May 20, 2004, now Pat. No. 6,922,208, which is a continuation of application No. 10/052,427, filed on Jan. 18, 2002, now Pat. No. 6,801,245.

(51) Int. Cl.
   *H04N 5/225* (2006.01)
(52) U.S. Cl. ................ 348/169; 235/385; 235/469; 235/494; 340/5.92

(58) Field of Classification Search ............... 348/86, 348/91, 94, 96, 161, 169, 195; 340/5.92, 340/572.1, 572.4, 521, 522, 573.1, 691.6; 705/22, 28; 235/385, 487, 494, 454, 469, 235/462.01; 250/555, 559.07, 559.08; 382/181, 382/224, 100, 141, 103

See application file for complete search history.

(56) References Cited

U.S. PATENT DOCUMENTS

| | | | | |
|---|---|---|---|---|
| 5,698,833 A | * | 12/1997 | Skinger | 235/462.09 |
| 6,142,375 A | * | 11/2000 | Belka et al. | 235/454 |
| 6,286,763 B1 | * | 9/2001 | Reynolds et al. | 235/472.01 |
| 6,526,158 B1 | * | 2/2003 | Goldberg | 382/115 |
| 6,801,245 B2 | * | 10/2004 | Shniberg et al. | 348/169 |
| 6,922,208 B2 | * | 7/2005 | Shniberg et al. | 348/169 |

* cited by examiner

*Primary Examiner*—Thomas J Mullen
(74) *Attorney, Agent, or Firm*—Goodwin Procter LLP

(57) ABSTRACT

A methodology for tracking objects includes receiving a multiplicity of objects to be tracked at a known location. Each multiplicity of objects has at least one imagable identifier affixed to it. The method also includes imaging the multiplicity of objects together at the known location to provide at least a partial image of the multiplicity of objects. The method also includes employing the partial image to determine an identification code for a plurality of the multiplicity of objects, as well as associating each identification code with a known location code.

40 Claims, 4 Drawing Sheets

METHOD FOR AUTOMATIC IDENTIFICATION AND DATA CAPTURE

CROSS-REFERENCE TO RELATED APPLICATIONS

This application is a continuation application of U.S. patent application Ser. No. 10/849,026, filed May 20, 2004, now U.S. Pat. No. 6,922,208, which is a continuation of U.S. patent application Ser. No. 10/052,427, filed Jan. 18. 2002, now U.S. Pat. No. 6,801,245, which are incorporated herein by reference.

FIELD OF THE INVENTION

The present invention relates to logistics systems and methodologies generally.

BACKGROUND OF THE INVENTION

The following patents and patent applications are believed to represent the current state of the art relevant to the present invention:

U.S. Pat. Nos. 4,044,227; 4,268,179; 4,794,238; 4,844,509; 5,468,949; 5,600,121; 5,621,864; 5,825,012; 5,828,048; 5,828,049; 5,988,508; 5,996,895; 6,070,801; 6,127,928; 6,206,286; 6,252,508; 6,259,408; 6,265,977; 6,283,375; 6,285,342; 6,286,763; 6,317,044.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
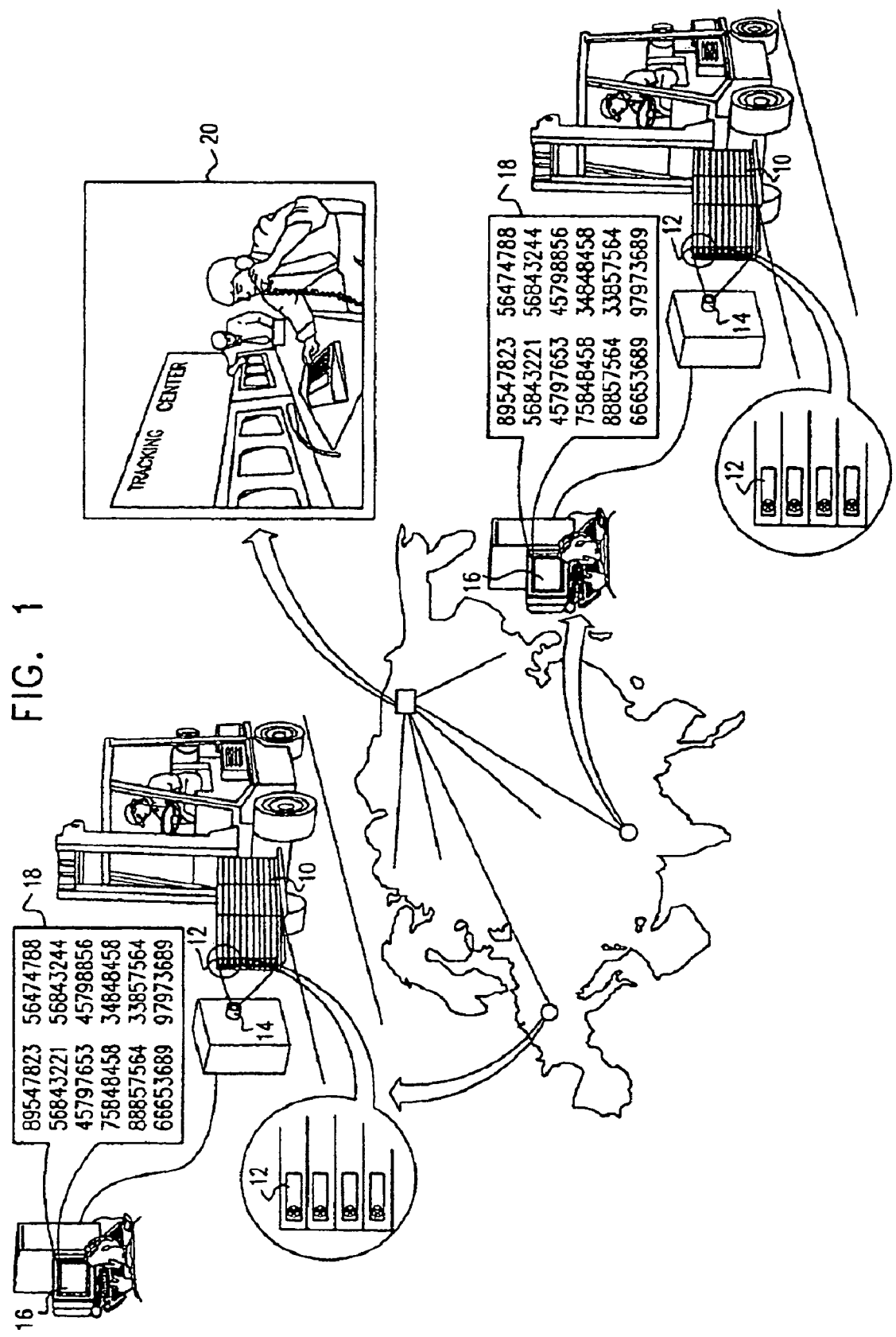
FIG. 1 is a simplified illustration of a multiple location object tracing and tracking system constructed and operative in accordance with a preferred embodiment of the present invention.

Reference is now made to FIG. 1, which is a simplified illustration of a multiple location object tracing and tracking system constructed and operative in accordance with a preferred embodiment of the present invention.

As seen in FIG. 1, there is preferably provided a tracing and tracking system which covers multiple geographically disparate locations at which it is sought to trace and track objects. At typical such locations, such as warehouses, a plurality of objects, such as stacked, collapsed containers 10, each bear an imagable identifier 12. The imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York, N.Y., U.S.A. under the trade name Imagecode The identifier is described in the following references, the disclosures of which are hereby incorporated by reference:

U.S. patent application Ser. No. 09/508,300, now abandoned.

Published PCT Patent Application WO 00/04711.

It is a particular feature of the present invention that the imagable identifiers on a plurality of objects may be imaged together, as in a single photograph, by a conventional imager 14, such as a digital camera. This is principally due to the fact that the various colors appear in the imagable identifier in two dimensional areas which are relatively easily differentiated from each other both spatially and in color space.

The image output of the imager is preferably provided to a computer 16, which may process the image output locally and provide an output indication 18 representing a plurality of numerical or alphanumerical identifiers corresponding to all of the imagable identifiers imaged in a given image or series of images. Alternatively or additionally, computer 16 may communicate via any suitable computer network, such as the Internet, with a remote tracking center 20, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 16 or in remote tracking center 20.

The remote tracking center 20 preferably compiles records of tracked numerical or alphanumerical identifiers from a multiplicity of geographically disparate locations so as to enable ready counting, tracking and locating of objects identified thereby. Remote tracking center 20 preferably maintains a database which is updated based on communications received from various geographically disparate locations.

Figure 2:
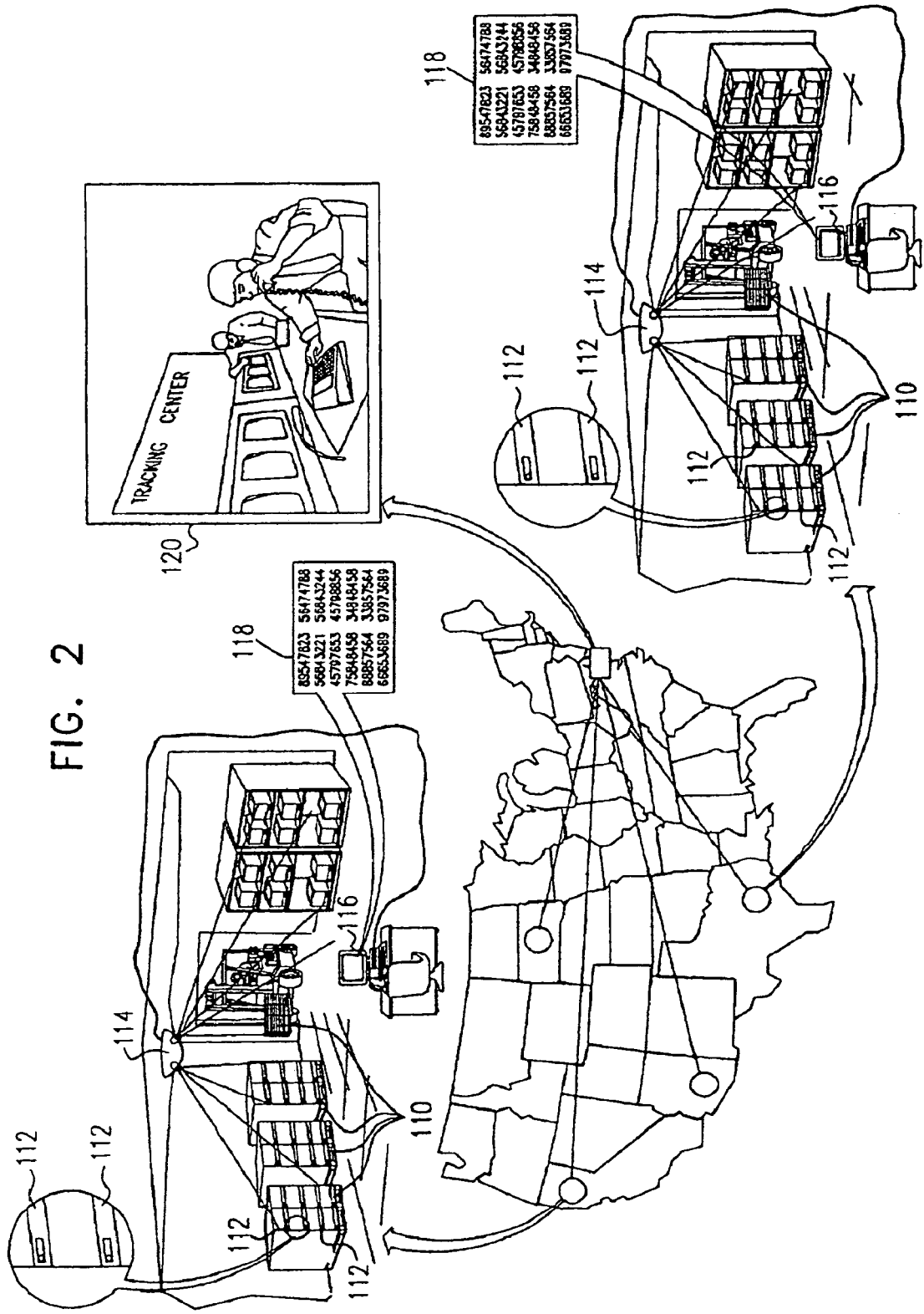
FIG. 2 is a simplified illustration of a multiple location object tracing and tracking system constructed and operative in accordance with another preferred embodiment of the present invention.

Reference is now made to FIG. 2, which is a simplified illustration of a multiple location object tracing and tracking system constructed and operative in accordance with another preferred embodiment of the present invention. As seen in FIG. 2, there is preferably provided a tracing and tracking system which covers multiple geographically disparate locations at which it is sought to trace and track objects. At typical such locations, such as warehouses, a plurality of objects, such as multiple stacks of containers 110 or objects stored on shelves, each bear an imagable identifier 112. The imagable identifier preferably comprises a multi-segment, multi-color identifier preferably in the form of a multi-segment color-coded disc wherein various segments have various colors A preferred imagable identifier is commercially available from ImageID Inc. of One Penn Plaza, Suite 2210, New York, N.Y., U.S.A. under the trade name Imagecode The identifier is described in the following references, the disclosures of which are hereby incorporated by reference:

U.S. patent application Ser. No. 09/508,300

Published PCT Patent Application WO 00/04711.

It is a particular feature of the present invention that the imagable identifiers on a plurality of objects may be automatically imaged together, as in a single photograph or a series of photographs, by a conventional imager 114, such as a panoramic digital camera. This is principally due to the fact that the various colors appear in the imagable identifier in two dimensional areas which are relatively easily differentiated from each other both spatially and in color space.

The arrangement of FIG. 2 is particularly useful for continuously updating inventory records of a large number of objects automatically, without the necessity of approaching each object or stack of objects or moving the objects past a tracking station.

The image output of the imager is preferably provided to a computer 116 which may process the image output locally and provide an output indication 118 representing a plurality of numerical or alphanumerical identifiers corresponding to all of the imagable identifiers imaged in a given image or series of images. Alternatively or additionally, computer 116 may communicate via any suitable computer network, such as the Internet, with a remote tracking center 120, which may receive either image outputs for processing or alternatively may receive the plurality of numerical or alphanumerical identifiers corresponding to all of the imagable identifiers imaged in a given image or series of images. The image outputs may also be stored for fixture retrieval, either locally in computer 116 or in remote tracking center 120.

The remote tracking center 120 preferably compiles records of tracked numerical or alphanumerical identifiers from a multiplicity of geographically disparate locations so as to enable ready counting, tracking and locating of objects identified thereby. Remote tracking center 120 preferably maintains a database which is updated based on communications received from various geographically disparate locations.

Figure 3:
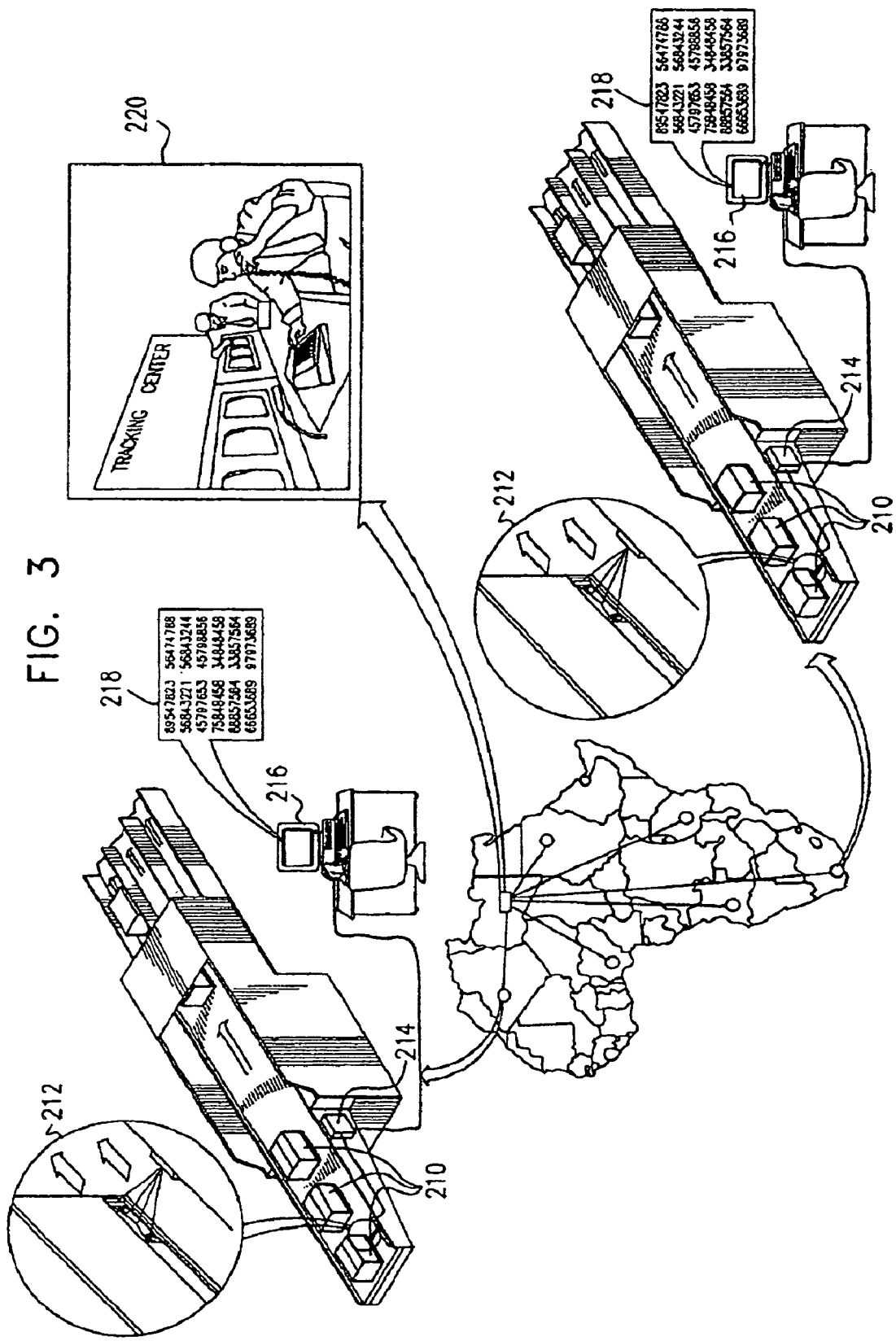
FIG. 3 is a simplified illustration of a multiple location object tracing and tracking system constructed and operative in accordance with yet another preferred embodiment of the present invention.

Reference is now made to FIG. 3, which is a simplified illustration of a multiple location object tracing and tracking system constructed and operative in accordance with yet another preferred embodiment of the present invention. As seen in FIG. 3, there is preferably provided a tracing and tracking system which covers multiple geographically disparate locations at which it is sought to trace and track objects. At typical such locations, such as warehouses, a plurality of objects, such as multiple containers 210, each bear a plurality of imagable identifiers 212. Each imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York, N.Y., U.S.A. under the trade name Imagecode. The identifier is described in the following references, the disclosures of which are hereby incorporated by reference:

U.S. patent application Ser. No. 09/508,300.
Published PCT Patent Application WO 00/04711.

It is a particular feature of the present invention that multiple imagable identifiers on one or more objects may be automatically imaged together, as in a single photograph or a series of photographs, by a conventional imager 214, such as a digital camera. This is principally due to the fact that the various colors appear in the imagable identifier in two dimensional areas which are relatively easily differentiated from each other both spatially and in color space.

The arrangement of FIG. 3 is particularly useful for providing a relatively large number of available numerical or alphanumerical identifiers. For example, use of a single Imagecode™ imagable identifier typically provides approximately 60,000 combinations. The use of two Imagecode™ imagable identifiers in a predetermined relative spatial orientation may provide approximately 60,000.times.60,000 combinations.

The image output of the imager is preferably provided to a computer 216, which may process the image output locally and provide an output indication 218 representing a plurality of numerical or alphanumerical identifiers corresponding to all of the pluralities of imagable identifiers imaged in a given image or series of images. Alternatively or additionally, computer 216 may communicate via any suitable computer network, such as the Internet, with a remote tracking center 220, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 216 or in remote tracking center 220.

The remote tracking center 220 preferably compiles records of tracked numerical or alphanumerical identifiers from a multiplicity of geographically disparate locations so as to enable ready counting, tracking and locating of objects identified thereby. Remote tracking center 220 preferably maintains a database which is updated based on communications received from various geographically disparate locations.

In accordance with a preferred embodiment of the present invention, the multi-segment, multi-color identifier 12, 112 and 212 is capable of identifying and distinguishing a plurality of objects at least equal to approximately:

$$\text{Plurality of objects} = (n.\text{times}.(n-1).\text{sup}.(p-2).\text{times}.(n-2))/p$$

where n is the number of different colors and p is the number of segments.

The foregoing calculation does not assume any predetermined orientation of the imagable identifier.

More preferably, the multi-segment, multi-color identifier is capable of identifying and distinguishing a plurality of objects at least equal to approximately:

$$\text{Plurality of objects} = (n.\text{times}.(n-1).\text{sup}.(p-2).\text{times}.(n-2))$$

where n is the number of different colors and p is the number of segments.

This calculation assumes a known or constant orientation of the imagable identifier.

In accordance with a preferred embodiment of the invention, the multi-segment, multi-color identifier has an inherent orientation. It is appreciated that this need not necessarily be the case When the multi-segment, multi-color identifier does not have an inherent orientation, the methodology exemplified in FIG. 4 is particularly useful.

Figure 4:
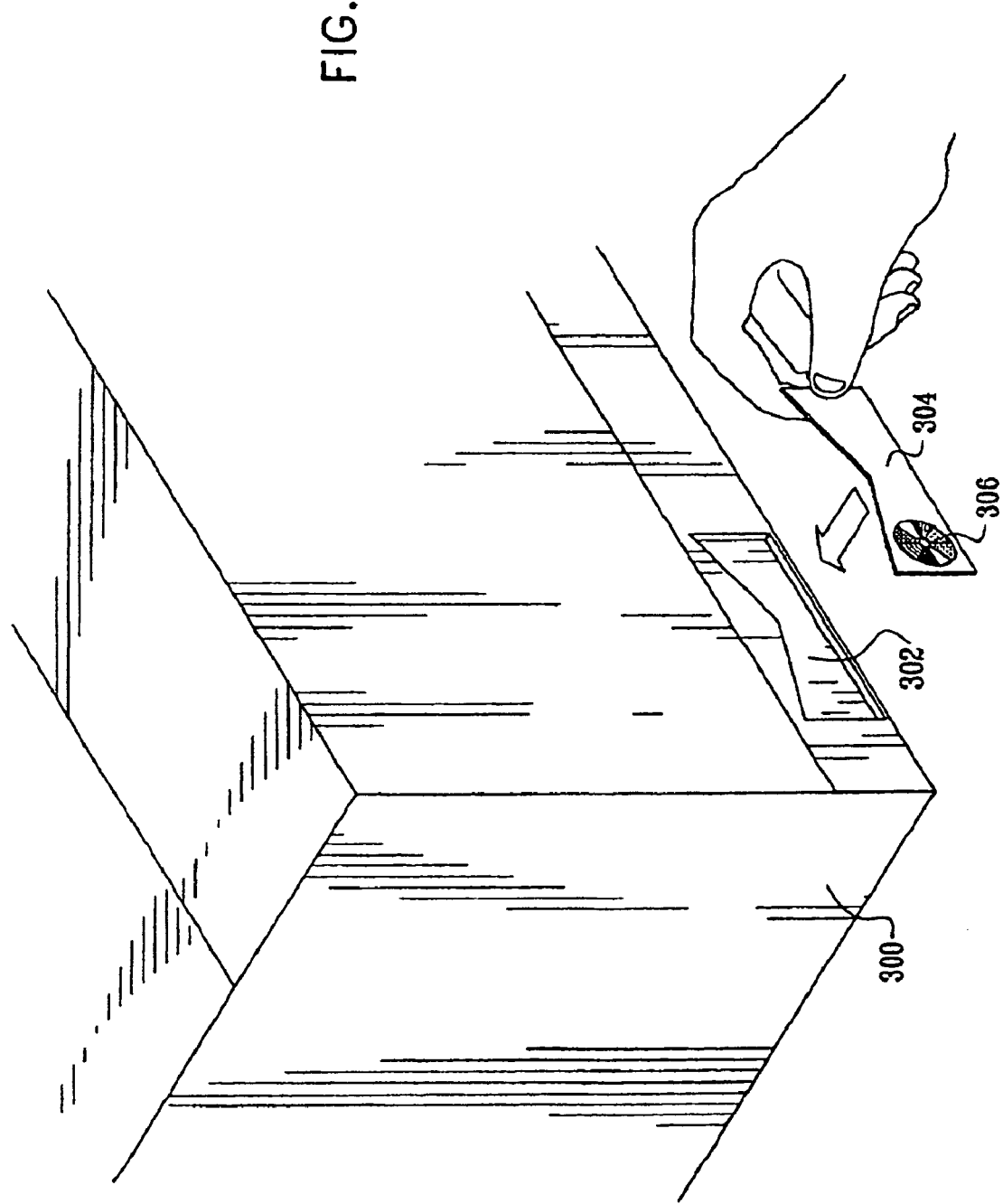
FIG. 4 is an illustration of a methodology for correct affixation of an imagable identifier to an object.

Reference is now made to FIG. 4, which is an illustration of a methodology for correct affixation of an imagable identifier to an object. It is appreciated that due to the circular symmetry of the Imagecode™ imagable identifier, consistency of affixation orientation is important in order to maximize the number of available combinations of numerical or alphanumerical identifiers while avoiding misidentification of objects.

One technique for ensuring correct affixation orientation is to mold or otherwise form onto a container 300, a three-dimensionally defined affixation location 302 and to provide an imagable identifier carrier 304, such as an adhesive backed sticker, which has a configuration, such as a notched configuration, which allows it to be placed in the three-dimensionally defined affixation location 302 only in one unique orientation relative to the container. Clearly, the structure and methodology shown in FIG. 4 is applicable to imagable identifier carriers 304 which bear multiple as well as single imagable identifiers 306. It is appreciated that other suitable techniques of unique orientation affixation may be employed, such as printing or molding of an imagable identifier directly onto an object.

It is noted that for the sake of clarity, the features of FIGS. 1, 2, 3 and 4 have been described separately. It is to be appreciated that the features of any one or all of FIGS. 1, 2, 3 and 4 may be advantageously combined in a given system or methodology.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A methodology to account for objects comprising: receiving a multiplicity of objects to be accounted for at a station, each of said multiplicity of objects having at least one imagable identifier affixed thereto; imaging said multiplicity of objects together at said station to provide an at least partial image of said multiplicity of objects; employing said at least partial image to determine an identification code for at least a plurality of said multiplicity of objects; and accounting for said objects, said accounting including but not limited to one or more of counting, tracking or locating one or more of said objects.

2. The methodology as in claim 1 further comprising communicating said at least partial image and its associated identification code to a remote location.

3. The methodology as in claim 1 and also comprising storing said at least partial image and its associated identification code.

4. The methodology as in claim 1 wherein said imaging is color imaging.

5. The methodology as in claim 1 wherein said at least one imagable identifier comprises a multi-color identifier.

6. The methodology as in claim 1 wherein said at least one imagable identifier comprises a multi-segment, multi-color identifier.

7. The methodology as in claim 6 wherein said identifier has an inherent orientation.

8. The methodology as in claim 1 wherein said imaging comprises sequentially imaging different pluralities of objects passing a given imaging station.

9. The methodology as in claim 1 wherein said at least one imagable identifier comprises a plurality of imagable identifiers arranged in at least predetermined propinquity to each other.

10. The methodology as in claim 1 wherein said employing comprises extracting said identification code from said at least partial image.

11. The methodology as in claim 1 wherein said identifier has an inherent orientation.

12. A system to account for objects comprising: an imager to image together at a station a multiplicity of objects to be accounted for, each one of said objects having at least one imagable identifier affixed thereto, and to provide an at least partial image of said multiplicity of said objects, said image including at least each of said at least one imagable identifiers; a processor employing said at least partial image to determine an identification code for a plurality of said multiplicity of objects; and accounting for said objects, said accounting including but not limited to one or more of counting, tracking or locating one or more of said objects.

13. The system as in claim 12 further comprising a communication unit to communicate said at least partial image and its associated identification code to a remote location.

14. The system as in claim 12 wherein said at least one imagable identifier comprises a multi-color identifier.

15. The system as in claim 12 wherein said at least one imagable identifier comprises a multi-segment, multi-color identitier.

16. The system as in claim 15 wherein said multi-segment, multi color identifier has an inherent orientation.

17. The system as in claim 12 and also comprising a storage unit to store said at least partial image and its associated identification code.

18. The system as in claim 12 and wherein said imager isa color imager.

19. The system as in claim 12 wherein said at least one imagable identifier comprises a plurality of imagable identifiers arranged in at least predetermined propinquity to each other.

20. The system as in claim 12 wherein said identifier has an inherent orientation.

21. A computer-readable medium having computer-executable instructions physically embodied thereon for causing computer to perform a methodology to account for a multiplicity of objects at a station, each of which has at least one imagable identifier affixed thereto, said methodology comprising: imaging together at said station said multiplicity of objects to provide an at least partial image of said multiplicity of objects, said image including said imagable identifier on each of said multiplicity of said objects; employing said at least partial image to determine an identification code for at least a plurality of said multiplicity of objects; and accounting for said objects, said accounting including but not limited to one or more of counting, tracking or locating one or more of said objects.

22. The computer-readable medium as in claim 21 further comprising communicating said at least partial image and its associated identification code to a remote location.

23. The computer-readable medium as in claim 21 wherein said at least one imagable identifier comprises a multi-color identifier.

24. The computer-readable medium as in claim 21 wherein said at least one imagable identifier comprises a multi-segment, multi-color identifier.

25. The computer-readable medium as in claim 24 wherein said multi-segment, multi-color identifier has an inherent orientation.

26. The computer-readable medium as in claim 21 wherein said imaging comprises sequentially imaging a plurality of said objects passing a given imaging station.

27. The computer-readable medium as in claim 21 wherein said at least one imagable identifier comprises a plurality of imagable identifiers arranged in at least predetermined propinquity to each other.

28. The computer-readable medium as in claim 21 and also comprising storing said at least partial image and its associated identification code.

29. The computer-readable medium as in claim 21 and wherein said imaging is color imaging.

30. The computer-readable medium as in claim 21 wherein said identifier has an inherent orientation.

31. A methodology to account for objects comprising: receiving a first multiplicity of objects to be accounted for at a first station, each of said first multiplicity of objects having at least one imagable identifier affixed thereto; imaging said first multiplicity of objects together at said first station to provide a first at least partial image of said first multiplicity of objects; employing said first at least partial image to determine a first set of identification codes, one for each of at least a plurality of said first multiplicity of objects; accounting for said first multiplicity of objects, said accounting including but not limited to one or more of counting, tracking or locating one or more of said first multiplicity of objects; receiving a second multiplicity of objects to be accounted for at a second station, each of said second multiplicity of objects having at least one imagable identifier affixed thereto; imaging said second multiplicity of objects together at said second station to provide a second at least partial image of said second multiplicity of objects; employing said second at least partial image to determine a second set of identification codes, one for each of at least a plurality of said second multiplicity of objects; and accounting for said second multiplicity of objects, said accounting including but not limited to one or more of counting, tracking or locating one or more of said second multiplicity of objects.

32. The methodology as in claim 31 wherein said imaging of said first multiplicity of objects and said imaging of said second multiplicity of objects occur at different times.

33. The methodology as in claim 31 wherein an object in said first multiplicity of objects is also in said second multiplicity of objects and said associated identification code with respect to said object are first stored and then updated.

34. The methodology as in claim 31 further comprising communicating at least one of said first or second at least partial image and its associated said identification code to a remote location.

35. The methodology as in claim 31 wherein said at least one imagable identifier comprises a multi-color identifier.

36. The methodology as in claim 31 wherein said at least one imagable identifier comprises a multi-segment, multi-color identifier.

37. The methodology as in claim 36 wherein said multi-segment, multi-color identifier has an inherent orientation.

38. The methodology as in claim 31 wherein said first and second imaging comprises sequentially imaging a plurality of said objects passing a given imaging station.

39. The methodology as in claim 31 wherein said at least one imagable identifier comprises a plurality of imagable identifiers arranged in at least predetermined propinquity to each other.

40. The methodology as in claim 31 and wherein said imaging is color imaging.

* * * * *